US009826544B2

(12) United States Patent  
Guo et al.

(10) Patent No.: US 9,826,544 B2  
(45) Date of Patent: Nov. 21, 2017

(54) METHOD FOR USE IN WIRELESS COMMUNICATION DEVICE REPORTING ACK/NACK IN DYNAMIC TDD CONFIGURATIONS, WIRELESS COMMUNICATION DEVICE, AND COMPUTER-READABLE PRODUCT

(71) Applicant: Telefonaktiebolaget L M Ericsson (publ), Stockholm (SE)

(72) Inventors: Zhiheng Guo, Beijing (CN); Rui Fan, Beijing (CN); Xinghua Song, Beijing (CN); Erik Eriksson, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/761,172

(22) PCT Filed: Jan. 17, 2014

(86) PCT No.: PCT/SE2014/050052  
§ 371 (c)(1),  
(2) Date: Jul. 15, 2015

(87) PCT Pub. No.: WO2014/116164  
PCT Pub. Date: Jul. 31, 2014

(65) Prior Publication Data  
US 2015/0358994 A1  Dec. 10, 2015

(30) Foreign Application Priority Data  
Jan. 25, 2013 (WO) ............... PCT/CN2013/070999

(51) Int. Cl.  
*H04J 3/00* (2006.01)  
*H04W 72/12* (2009.01)  
(Continued)

(52) U.S. Cl.  
CPC ....... *H04W 72/1268* (2013.01); *H04L 1/1861* (2013.01); *H04L 5/0055* (2013.01);  
(Continued)

(58) Field of Classification Search  
None  
See application file for complete search history.

(56) References Cited

U.S. PATENT DOCUMENTS

| | | | | |
|---|---|---|---|---|
| 2012/0113907 | A1* | 5/2012 | Baldemair | ......... H04W 52/325 370/329 |
| 2012/0281645 | A1* | 11/2012 | Li | ......... H04L 1/1829 370/329 |

(Continued)

OTHER PUBLICATIONS

Alcatel-Lucent Shanghai Bell, et al., "R1-122510: Discussion on timing issues with dynamic TDD UL-DL configuration," 3rd Generation Partnership Project (3GPP), TSG RAN WG1 Meeting #69, May 21-25, 2012, 8 pages, Prague, Czech Republic.

(Continued)

*Primary Examiner* — Edan Orgad  
*Assistant Examiner* — Rebecca Song  
(74) *Attorney, Agent, or Firm* — Withrow & Terranova, PLLC

(57) ABSTRACT

The present disclosure relates to a method for use in a wireless communication device reporting ACK or NACK in dynamic TDD configurations. In the method, an indication of a reference UL TDD configuration and a reference DL TDD configuration is indicated. Then, ACK or NACK bits with a fixed number of the ACK or NACK bits based on the reference DL TDD configuration are reported at a timing based on the reference DL TDD configuration. The present disclosure also relates to a wireless communication device for reporting ACK/NACK in dynamic TDD configurations.

20 Claims, 7 Drawing Sheets

(51) Int. Cl.
*H04L 5/14* (2006.01)
*H04L 1/18* (2006.01)
*H04L 5/00* (2006.01)

(52) U.S. Cl.
CPC ....... *H04L 5/1476* (2013.01); *H04W 72/1284* (2013.01); *H04W 72/1294* (2013.01)

(56) References Cited

U.S. PATENT DOCUMENTS

| | | | |
|---|---|---|---|
| 2012/0320805 A1* | 12/2012 | Yang | H04L 1/18 370/280 |
| 2013/0223299 A1* | 8/2013 | Yang | H04L 1/1685 370/280 |
| 2013/0242819 A1* | 9/2013 | He | H04L 5/1469 370/280 |
| 2014/0198733 A1* | 7/2014 | Yin | H04W 72/0446 370/329 |

OTHER PUBLICATIONS

Author Unknown, "Technical Specification Group Radio Access Network; Evolved Universal Terrestrial Radio Access (E-UTRA); Multiplexing and channel coding (Release 11)," Technical Specification 36.212, Version 11.1.0, 3GPP Organizational Partners, Dec. 2012, 82 pages.

Author Unknown, "Technical Specification Group Radio Access Network; Evolved Universal Terrestrial Radio Access (E-UTRA); Physical layer procedures (Release 10)," Technical Specification 36.213, Version 10.8.0, 3GPP Organizational Partners, Dec. 2012, 126 pages.

Ericsson, et al., "R1-130558: Signalling support for dynamic TDD," 3rd Generation Partnership Project (3GPP), TSG-RAN WG1 #72, Jan. 28-Feb. 1, 2013, 3 pages, St. Julian's, Malta.

HTC, "R1-130310: On HARQ Timing Issues for TDD UL-DL Reconfiguration," 3rd Generation Partnership Project (3GPP), TSG-RAN WG1 #72, Jan. 18-Feb. 1, 2013, 5 pages, Malta.

International Preliminary Report on Patentability for International Patent Application No. PCT/SE2014/050052, dated Mar. 31, 2015, 6 pages.

International Search Report for International Patent Application No. PCT/SE2014/050052, dated Apr. 10, 2014, 2 pages.

Author Unknown, "Technical Specification Group Radio Access Network; Evolved Universal Terrestrial Radio Access (E-UTRA); Physical layer procedures (Release 11)," Technical Specification 36.213, Version 11.1.0, 3GPP Organizational Partners, Dec. 2012, 160 pages.

* cited by examiner

METHOD FOR USE IN WIRELESS COMMUNICATION DEVICE REPORTING ACK/NACK IN DYNAMIC TDD CONFIGURATIONS, WIRELESS COMMUNICATION DEVICE, AND COMPUTER-READABLE PRODUCT

This application is a 35 U.S.C. §371 national phase filing of International Application No. PCT/SE2014/050052, filed Jan. 17, 2014, which claims priority to International Application No. PCT/CN2013/070999, filed Jan. 25, 2013, the disclosures of which are incorporated herein by reference in their entireties.

TECHNICAL FIELD

The technology presented in this disclosure generally relate to radio communication networks, particularly (though not exclusively) radio communication networks using Time Division Duplex (TDD), for example Long-Term Evolution (LTE) TDD. More particularly, the present disclosure relates to a method for use in a wireless communication device (e.g., user equipment (UE)) reporting acknowledgement (ACK)/non-acknowledgement (NACK) in dynamic TDD configurations, a wireless communication device (e.g., UE) and a computer-readable product.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

In a typical cellular radio system, wireless communication devices (e.g., user equipments (UEs)) can communicate via a radio access network (RAN) to one or more core networks (CN). The RAN generally covers a geographical area which is divided into radio cell areas. Each radio cell area can be served by a base station, e.g., a radio base station (RBS), which in some networks may also be called, for example, a "NodeB" (UMTS) or "eNodeB" (LTE). A radio cell is a geographical area where radio coverage is generally provided by the radio base station at a base station site. Each radio cell can be identified by an identity within the local radio area, which is broadcast in the radio cell. The base stations communicate over the air interface operating on radio frequencies with the wireless communication devices within range of the base stations. In some radio access networks, several base stations may be connected (for example, by landlines or microwave) to a radio network controller (RNC) or a base station controller (BSC). The radio network controller may be configured to supervise and coordinate the various activities of the plurality of base stations connected thereto. The radio network controllers may also be connected to one or more core networks. The Universal Mobile Telecommunications System (UMTS) is a third generation mobile communication system, which evolved from the Global System for Mobile Communications (GSM). The Universal Terrestrial Radio Access Network (UTRAN) is essentially a radio access network using Wideband Code Division Multiple Access (WCDMA) for wireless communication devices. As an alternative to WCDMA, Time Division Synchronous Code Division Multiple Access (TD-SCDMA) could be used. In a standardization forum known as the Third Generation Partnership Project (3GPP), telecommunications suppliers propose and agree upon standards for third generation networks and UTRAN specifically, and investigate e.g. enhanced data rate and radio capacity. The 3GPP has undertaken to evolve the UTRAN and GSM based radio access network technologies. The first releases for the Evolved Universal Terrestrial Radio Access Network (E-UTRAN) specification have been issued. The Evolved Universal Terrestrial Radio Access Network (E-UTRAN) comprises the Long Term Evolution (LTE) and System Architecture Evolution (SAE). Long Term Evolution (LTE) is a variant of a 3GPP radio access technology where the radio base station nodes are connected to a core network (e.g., via Access Gateways (AGWs)) rather than to radio network controller (RNC) nodes. In general, in LTE the functions of a radio network controller (RNC) node are distributed between the radio base stations nodes (eNodeB's in LTE) and AGWs. As such, the radio access network (RAN) of an LTE system has what is sometimes referred to as a "flat" architecture including radio base station nodes without reporting to radio network controller (RNC) nodes.

Transmission and reception from a node, e.g., a radio terminal like a UE in a cellular system such as LTE, can be multiplexed in the frequency domain or in the time domain (or combinations thereof). In Frequency Division Duplex (FDD), downlink (DL) and uplink (UL) transmission take place in different, sufficiently separated, frequency bands. In Time Division Duplex (TDD), DL and UL transmission take place in different, non-overlapping time slots. Thus, TDD can operate in unpaired frequency spectrum, whereas FDD generally requires paired frequency spectrum.

Typically, a transmitted signal in a radio communication system is organized in some form of frame structure, or frame configuration. For example, LTE generally uses ten equally sized subframes 0-9 of length 1 ms per radio frame as illustrated in FIG. 1. In case of TDD as shown in FIG. 1, there is generally only a single carrier frequency, and UL and DL transmissions are separated in time. Because the same carrier frequency is used for uplink and downlink transmission, both the base station and the UEs need to switch from transmission to reception and vice versa. An important aspect of a TDD system is to provide a sufficiently large guard time where neither DL nor UL transmissions occur in order to avoid interference between UL and DL transmissions. For LTE, special subframes (e.g., subframe #1 and, in some cases, subframe #6) provide this guard time. A TDD special subframe is generally split into three parts: a downlink part (DwPTS), a guard period (GP), and an uplink part (UpPTS). The remaining subframes are either allocated to UL or DL transmission. Example UL-DL configurations (also referred to as "TDD configuration" in the present disclosure) are shown in Table 1 below. Also, exemplary special subframe configurations are shown in Table 2 below.

TABLE 1

Exemplary UL and DL configurations in TDD

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |

TABLE 1-continued

Exemplary UL and DL configurations in TDD

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 2

Example configurations of special subframe

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

TDD allows for different asymmetries in terms of the amount of resources allocated for UL and DL transmission, respectively, by means of different DL/UL configurations. In LTE, there are seven different configurations, see FIG. 2. Generally speaking, to avoid significant interference between DL and UL transmissions between different radio cells, neighboring radio cells should have the same DL/UL configuration. Otherwise, UL transmission in one radio cell may interfere with DL transmission in the neighboring radio cell (and vice versa). As a result, the DL/UL asymmetry generally does not vary between radio cells. The DL/UL asymmetry configuration is signaled, i.e. communicated, as part of the system information and can remain fixed for a long time.

Consequently, the TDD networks generally use a fixed frame configuration where some subframes are UL and some are DL. This may prevent or at least limit the flexibility to adopt the UL and/or DL resource asymmetry to varying radio traffic situations.

In future networks, it is envisioned that we will see more and more localized traffic, where most of the users will be in hotspots, or in indoor areas, or in residential areas. These users will be located in clusters and will produce different UL and DL traffic at different time. This essentially means that a dynamic feature to adjust the UL and DL resources to instantaneous (or near instantaneous) traffic variations would be required in future local area cells.

TDD has a potential feature where the usable band can be configured in different time slots to either in UL or DL. It allows for asymmetric UL/DL allocation, which is a TDD-specific property, and not possible in FDD. There are seven different UL/DL allocations in LTE, providing 40%-90% DL resources.

In the current networks, UL/DL configuration is semi-statically configured, thus it may not match the instantaneous traffic situation. This will result in inefficient resource utilization in both UL and DL, especially in cells with a small number of users. In order to provide a more flexible TDD configuration, so-called Dynamic TDD (also sometimes referred to as Flexible TDD) has therefore been introduced. Thus, Dynamic TDD configures the TDD UL/DL asymmetry to current traffic situation in order to optimize user experience. Dynamic TDD provides the ability of a subframe to be configured as "flexible" subframe. As a result, some subframes can be configured dynamically as either for UL transmission or for DL transmission. The subframes can for example be configured as either for UL transmission or DL transmission depending on e.g. the radio traffic situation in a cell. Accordingly, Dynamic TDD can be expected to achieve promising performance improvement in TDD systems when there is a potential load imbalance between UL and DL. Besides, Dynamic TDD approach can also be utilized to reduce network energy consumption. It is expected that dynamic UL/DL allocation (hence referred in this section "Dynamic TDD") should provide a good match of allocated resources to instantaneous traffic.

The UL scheduling can be indicated by Downlink Control Information (DCI) format 0 or Physical Hybrid Automatic Repeat Request (HARQ) indicator channel (PHICH) in a DL subframe (referring to Section 8 in the 3GPP Technical Specification 3GPP TS 36.213, *"Evolved Universal Terrestrial Radio Access (E-UTRA); Physical layer procedures"*, v.11.1.0).

SUMMARY

It is in view of the above considerations and others that the various embodiments of the present technology have been made.

According to one aspect of the present disclosure, there is proposed a method for use in a wireless communication device reporting ACK or NACK in dynamic TDD configurations. In the method, an indication of a reference UL TDD configuration and a reference DL TDD configuration is indicated. Then, ACK or NACK bits with a fixed number of the ACK or NACK bits based on the reference DL TDD configuration are reported at a timing based on the reference DL TDD configuration.

According to another aspect of the present disclosure, there is proposed a wireless communication device for reporting ACK/NACK in dynamic TDD configurations, the wireless communication device comprising a receiver, a transmitter, a memory and a processor. The memory is configured to store TDD configurations. The processor is configured to control the receiver to receive an indication of a reference UL TDD configuration and a reference DL TDD configuration. The processor is further configured to control the transmitter to report ACK or NACK bits with a fixed number of the ACK or NACK bits based on the reference DL TDD configuration at a timing based on the reference DL TDD configuration.

According to yet another aspect of the present disclosure, there is proposed a terminal for reporting ACK or NACK in dynamic TDD configurations, the terminal comprising: means for receiving an indication of a reference UL TDD configuration and a reference DL TDD configuration; and means for reporting ACK or NACK bits with a fixed number of the ACK or NACK bits based on the reference DL TDD configuration at a timing based on the reference DL TDD configuration.

According to still another aspect of the present disclosure, there is proposed a wireless communication device for reporting ACK or NACK in dynamic TDD configurations, the wireless communication device comprising a processor and a memory, said memory containing instructions executable by said processor, whereby said user terminal is operative to: receive an indication of a reference UL TDD configuration and a reference DL TDD configuration; and report ACK or NACK bits with a fixed number of the ACK or NACK bits based on the reference DL TDD configuration at a timing based on the reference DL TDD configuration.

With the technical solutions disclosed in the present disclosure, a simple dynamic TDD solution can be achieved, and also an L1 controlled dynamic TDD can be achieved. The wireless communication terminal will not be confused on how many ACK/NACK bits will be reported. Especially, the solution is very useful for those dynamic TDD solutions adopting TDD configurations 0, 1, 2, 6.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF EMBODIMENTS

Figure 1:
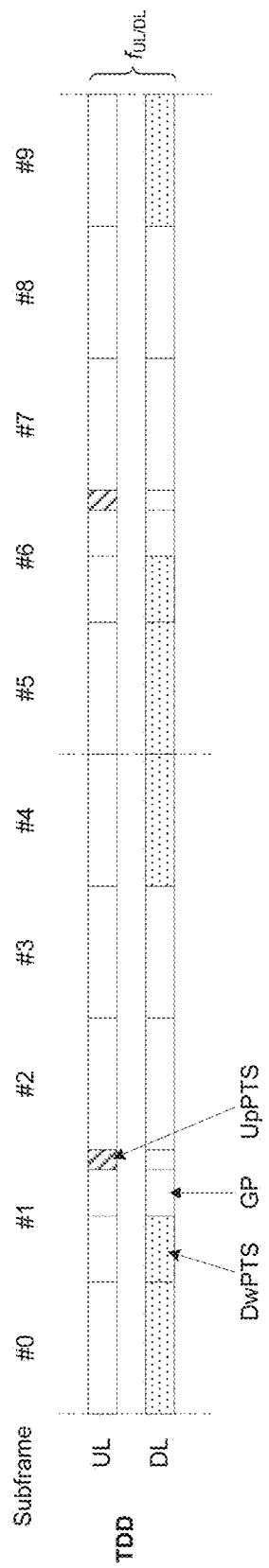
FIG. 1 illustrates uplink/downlink time/frequency structure for LTE TDD.

In the following description, for purposes of explanation and not limitation, specific details are set forth such as particular architectures, interfaces, techniques, etc. However, it will be apparent to those skilled in the art that the technology described here may be practiced in other embodiments that depart from these specific details. That is, those skilled in the art will be able to devise various arrangements which, although not explicitly described or shown herein, embody the principles of the technology described and are included within its scope. In some instances, detailed descriptions of well-known devices, circuits, and methods are omitted so as not to obscure the description with unnecessary detail. All statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated by those skilled in the art that block diagrams herein can represent conceptual views of illustrative circuitry embodying the principles of the technology. Similarly, it will be appreciated that any flow charts and the like represent various processes which may be substantially represented in computer readable medium and so executed by a computer or processor, whether or not such computer or processor is explicitly shown. The functions of the various elements including functional blocks labeled or described as "processor" may be provided through the use of dedicated hardware as well as hardware capable of executing software in the form of coded instructions stored on computer readable medium. When provided by a processor, the functions may be provided by a single dedicated processor, by a single shared processor, or by a plurality of individual processors, some of which may be shared or distributed. Such functions are to be understood as being computer-implemented and thus machine-implemented. Moreover, use of the term "processor" or shall also be construed to refer to other hardware capable of performing such functions and/or executing software, and may include, without limitation, digital signal processor (DSP) hardware, reduced instruction set processor, hardware (e.g., digital or analog) circuitry, and (where appropriate) state machines capable of performing such functions.

As used hereinafter, it should be appreciated the term UE may be referred to as a mobile terminal, a terminal, a user terminal (UT), a wireless terminal, a wireless communication device, a wireless transmit/receive unit (WTRU), a mobile phone, a cell phone, etc. Yet further, the term UE includes MTC (Machine Type Communication) devices, which do not necessarily involve human interaction. Also, the term "radio network node" as used herein generally denotes a fixed point being capable of communicating with the UE. As such, it may be referred to as a base station, a radio base station, a NodeB or an evolved NodeB (eNB), access point, relay node, etcetera.

In L1 controlled dynamic TDD (referring to R1-130558 "Signalling support for dynamic TDD", Ericsson, ST-Ericsson), the UE will adjust its scheduling timing for UL and DL based on two reference TDD configurations respectively. The UE will schedule UL transmission based on a reference UL TDD configuration and schedule DL transmissions based on a reference DL TDD configurations. One example is to schedule UL transmissions using TDD configuration 0 and to schedule DL transmissions using TDD configuration 1. In this case, subframe #4 and #9 are used as flexible subframes, which can be used as for either UL or DL.

The benefits with the L1 controlled dynamic TDD are in that it provides fully dynamic control giving the largest performance benefits. It also ensures that control signaling, other than DL scheduling, will not experience cross link interference. It has a natural way of handling HARQ continuity between switches. It also has minimum signaling overhead since the direction is controlled implicitly by the scheduling, which is needed for each transmission anyway.

However, the following issue is observed by the present inventors.

For TDD configuration 0 and other configurations 1-6, although the payload size of DCI format 0 is the same, but there are two bits (which are just after the bits for cyclic shift for DM RS) in the payload which have different interpretations.

In TDD configuration 0, these two bits are for UL index. Differently in TDD configuration 1-6, these two bits are for DAI (downlink assignment index). Different interpretations of these two bits will lead to different UE behaviors.

If TDD configuration 0 is used as the UL reference TDD configuration, all the possible UL subframes can be scheduled, but this is accomplished with the help of UL index in DCI format 0. However, as indicated above, the two bits for UL index in DCI format 0 in TDD configuration 0 will be interpreted as DAI in other TDD configurations 1-6. DAI is to indicate the number of ACK/NACK bits used for UE to report the feedback for the related downlink subframes. So there is an ambiguity in the number of ACK/NACK bits if TDD configuration 0 is used as the reference TDD configurations.

In this regard, the following issue arises.

In dynamic TDD, assuming N TDD configurations (2≤N≤7) are included in the dynamically changed UL-DL configuration set, in which UL-DL configuration 0 is included, then the UL subframes scheduling mechanism follows the mechanism of UL-DL configuration 0, all possible UL subframes can be scheduled by DCI format 0.

Because UL index is involved in the UL scheduling of subframes #3 and #8, the two bit in DCI format 0 for UL index in UL-DL configuration 0 and for DAI in other UL-DL configurations are always interpreted as UL index in order to dynamically schedule UL subframes.

However, DAI of DCI format 0 in, for example, TDD configuration 1 indicates the number of ACK/NACK bits that UE should feedback to eNB on PUSCH. If the number of ACK/NACK bits mismatch between eNB and UE, the ACK/NACK bit will not be decoded correctly. This will result in uplink radio link failure since the UL HARQ mechanism is ruined.

On the other hand, the N TDD configurations do not include TDD configuration 0. Then, dynamically changing between any two UL-DL configurations excluding TDD configuration 0 will lead to no conflicts on the understanding of DCI format 0.

In UL-DL configuration 0, 60% resources are allocated to UL, and TDD configuration 0 is the only one where the number of UL subframes is larger than DL subframes.

Therefore, TDD configuration 0 is suitable for UL traffic heavy scenarios. So UL-DL configuration 0 should be included in the dynamic TDD. Furthermore, if no DCI format 0 is detected, UE will be confused on which subframe to report the ACK/NACK bits.

According to the proposed technical solution, a method for UE reporting ACK/NACK in dynamic TDD configurations is proposed. In the method, referring to FIG. 3 which shows a flowchart of the method 300, an indication of a reference UL TDD configuration and a reference DL TDD configuration is received (e.g., via physical downlink control channel, PDCCH) (Step 310). Thereafter, ACK/NACK bits with a fixed number of the ACK/NACK bits based on the reference DL TDD configuration are reported at a timing based on the reference DL TDD configuration (Step 340).

The method 300 may further comprise two additional steps, Step 320 and Step 330 (as shown in dashed blocks in FIG. 3), between Step 310 and Step 340. In Step 320, DCI for UL scheduling (e.g., DCI format 0) is received (e.g., via PDCCH) based on the reference DL TDD configuration. Then, in Step 330, the DCI for UL scheduling is interpreted based on the reference UL TDD configuration (e.g., interpreted as UL index bits if the reference UL TDD configuration is TDD configuration 0, or interpreted as DAI bits if the reference TDD configuration is one of TDD configurations 1-6).

In the present disclosure, the fixed number of the ACK/NACK bits can be determined based on (e.g., fixed to) the maximum bit number available in the reference DL TDD configuration for one or more DL subframes allocated to the UE.

In the present disclosure, the reference UL TDD configuration can be TDD configuration 0, and the reference DL TDD configuration can be one of TDD configurations 1-6.

Figure 2:
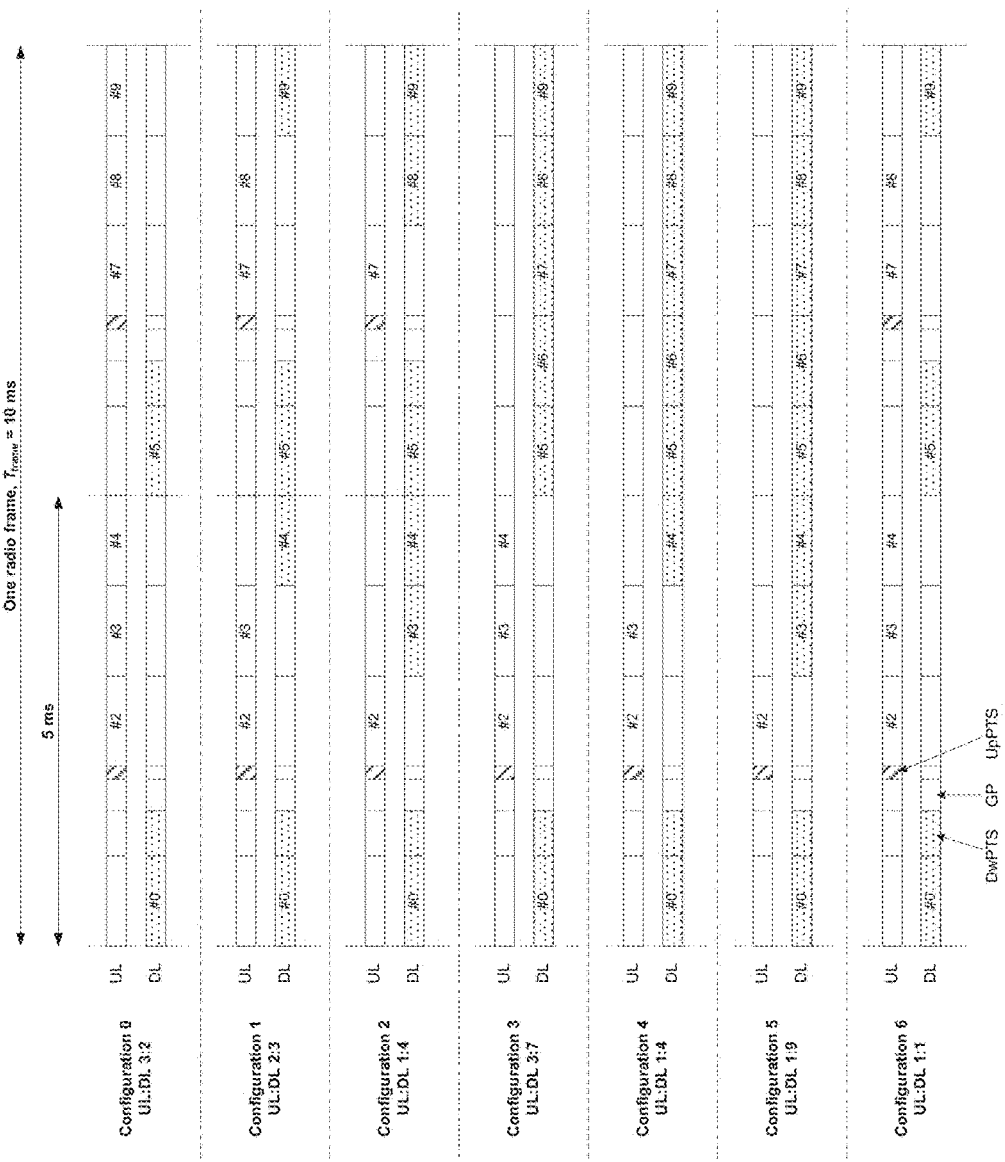
FIG. 2 is a diagram illustrating an example of seven different downlink/uplink configurations for LTE TDD.

Recalling to FIG. 2, TDD configuration 0 has an UL/DL traffic ratio of 60%, TDD configuration 1 has an UL/DL traffic ratio of 40%, TDD configuration 2 has an UL/DL traffic ratio of 20%, TDD configuration 3 has an UL/DL traffic ratio of 30%, TDD configuration 4 has an UL/DL traffic ratio of 20%, TDD configuration 5 has an UL/DL traffic ratio of 10%, and TDD configuration 6 has an UL/DL traffic ratio of 50%.

Hereunder, some examples will be explained in details by assuming the reference UL TDD configuration is TDD configuration 0, and the reference DL TDD configuration is TDD configuration 1 or TDD configuration 2. In these examples, the subframes #3, #4, #8 and #9 are flexible subframes that can be allocated as UL and DL subframes.

Example 1—TDD Configuration 0 (UL), TDD Configuration 1 (DL)

When DCI format 0 is received by UE, UE interprets the received DCI format 0 based on TDD configuration 0, i.e., the two bits in DCI format 0 for UL index in TDD configuration 0 and for DAI in TDD configuration 1 are interpreted as UL index bits.

UE reports ACK/NACK bits by following the mechanism of UL-DL configuration 1, i.e., by determining the timing and number of ACK/NACK bits based on TDD configuration 1.

The reported ACK/NACK bits includes 2 bits in subframe #2 and 2 bits in subframe #7, if either or both of the subframes #2 and #7 are allocated to the UE by DCI format 0 (referring to Section 10.1.3.1 in the 3GPP Technical Specification 3GPP TS 36.213, *"Evolved Universal Terrestrial Radio Access (E-UTRA); Physi-*

*cal layer procedures*", v.11.1.0). That is, the number of ACK/NACK bits is fixed to the maximum bit number available in TDD configuration 1 for one or more subframes allocated to the UE.

The reported ACK/NACK bits includes 1 bit in subframe #3 and 1 bit in subframe #8, if either or both of the subframes #3 and #8 are allocated to the UE by DCI format 0 (referring to Section 10.1.3.1 in the 3GPP Technical Specification 3GPP TS 36.213, *"Evolved Universal Terrestrial Radio Access (E-UTRA); Physical layer procedures"*, v.11.1.0). That is, the number of ACK/NACK bits is fixed to the maximum bit number available in TDD configuration 1 for one or more subframes allocated to the UE.

Example 2—TDD Configuration 0 (UL), TDD Configuration 2 (DL)

When DCI format 0 is received by UE, UE interprets the received DCI format 0 based on TDD configuration 0, i.e., the two bits in DCI format 0 for UL index in TDD configuration 0 and for DAI in TDD configuration 2 are interpreted as UL index bits.

UE reports ACK/NACK bits by following the mechanism of UL-DL configuration 2, i.e., by determining the reporting timing and number of ACK/NACK bits based on DAI of DCI format 0 of a subframe received according to TDD configuration 2.

The reported ACK/NACK bits includes 4 bits in subframe #2 and 4 bits in subframe #7, if either or both of the subframes #2 and #7 are allocated to the UE by DCI format 0 (referring to Section 10.1.3.1 in the 3GPP Technical Specification 3GPP TS 36.213, *"Evolved Universal Terrestrial Radio Access (E-UTRA); Physical layer procedures"*, v.11.1.0). That is, the number of ACK/NACK bits is fixed to the maximum bit number available in TDD configuration 2 for one or more subframes allocated to the UE.

In some embodiments (including but not limited to the above Examples 1 and 2), each ACK/NACK bit corresponds to a DL subframe mapping to a current UL physical uplink shared channel (PUSCH). If physical downlink control channel (PDCCH) for DL scheduling is not detected in a DL subframe, UE sets ACK/NACK bit corresponding to the DL subframe to NACK. eNB will judge which ACK/NACK bits reported by the UE is valid according to DL scheduling information.

For example, in the above Example 2, the ACK/NACK reporting mechanism will follow the mechanism of UL-DL configuration 2. For example, if subframe #2 is allocated to UE, the UE will report 4 bits ACK/NACK to eNB in subframe #2, wherein the 4 bits ACK/NACK correspond to subframes #4, #5, #8 and #6 of last DL frame (referring to Section 10.1.3.1 in the 3GPP Technical Specification 3GPP TS 36.213, *"Evolved Universal Terrestrial Radio Access (E-UTRA); Physical layer procedures"*, v.11.1.0). eNB will judge which ACK/NACK bit is valid. For example, if subframe #5 of the last DL frame is not allocated to the UE, then the eNB will determine the ACK/NACK bit corresponding to subframe #5 is invalid.

Herein, a trigger mechanism can be introduced with DC's for DL scheduling. If no DCI for DL scheduling is received/detected in any DL subframe, UE does not report the ACK/NACK bits. If DCI for DL scheduling is received/detected in a DL subframe, then an UL subframe mapping to this DL subframe can be determined and the maximum number of ACK/NACK bits available in the reference DL TDD configuration for DL subframes mapping to this UL subframe will be reported. For those subframes where no DL transmission or DCI is received, the corresponding ACK/NACK bits will be set to NACK.

As an extension, UE may only fill up with NACKs for subframes after the received/detected DCI information containing a correct DAI, i.e., a DAI corresponding to the UE's expected DAI.

Figure 4:
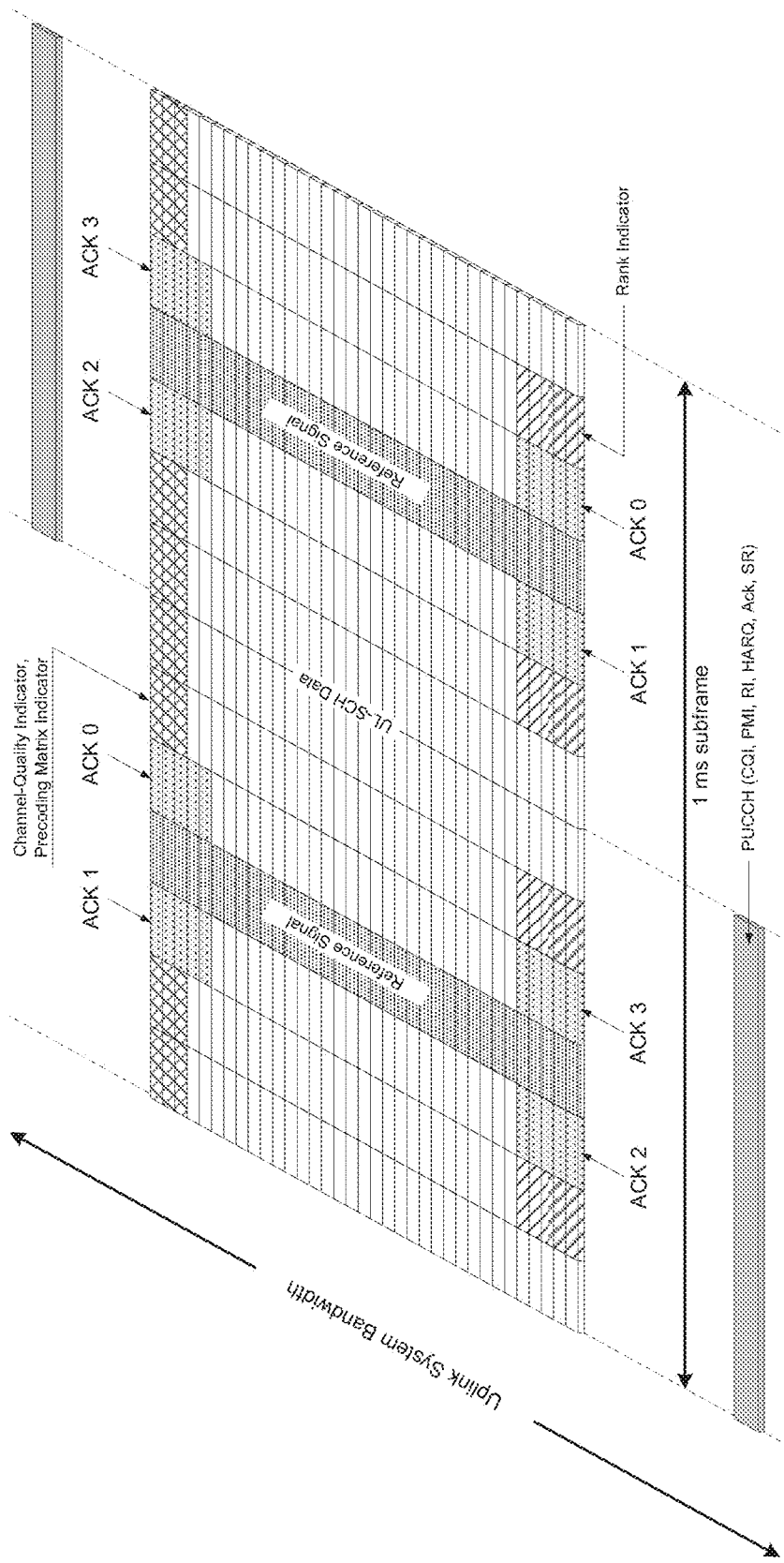
FIG. 4 is a schematic diagram illustrating ACK/NACK separate encoding and mapping.

In some embodiments, as shown in FIG. 4, when UE is configured for Dynamic TDD, UE may change its encoding procedure of ACK/NACK bits. For example, UE may separately encode ACK/NACK bits and map them to separate resource elements in UL transmission. The resource mapping may depend on the value of the associated DAI, if present, or the subframe index from which the ACK/NACK originates.

Figure 5:
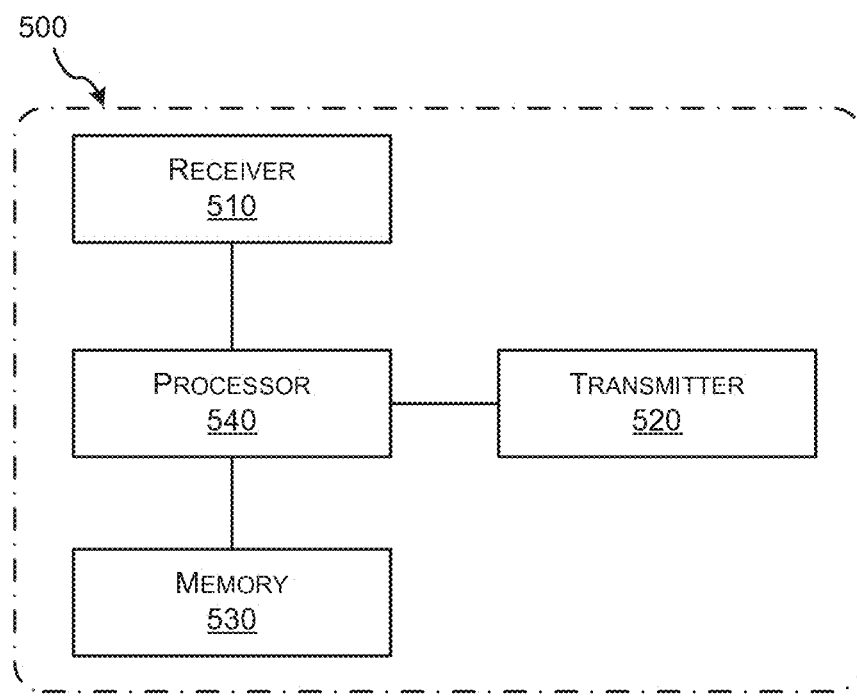
FIG. 5 is a schematic block diagram of UE according to some embodiments of the present disclosure.

FIG. 5 is a schematic block diagram of UE 500 according to some embodiments of the present disclosure.

As shown, UE 500 includes a receiver 510, a transmitter 520, a memory 530 and a processor 540. The memory 530 stores TDD configurations (e.g., TDD configurations 0-6). The processor 540 controls, e.g., according to instructions stored in the memory 530, the receiver 510 to receive an indication of a reference UL TDD configuration and a reference DL TDD configuration. The processor 540 also controls, e.g., according to instructions stored in the memory 530, the transmitter 520 to report ACK/NACK bits with a fixed number of the ACK/NACK bits based on the reference DL TDD configuration at a timing based on the reference DL TDD configuration. The processor 540 may further control, e.g., according to instructions stored in the memory 530, the receiver 510 to receive DCI for UL scheduling based on the reference DL TDD configuration. The processor 540 then interprets, e.g., according to instructions stored in the memory 530, the received DCI for UL scheduling based on the reference UL TDD configuration.

As above, the fixed number of the ACK/NACK bits can be determined based on (e.g., fixed to) the maximum bit number available in the reference DL TDD configuration for one or more DL subframes allocated to the UE 500. As above, the reference UL TDD configuration can be TDD configuration 0, and the reference DL TDD configuration can be one of TDD configurations 1-6.

Similarly, UE 500 may be applied in the above Examples 1 or 2 in which the reference UL TDD configuration is TDD configuration 0, and the reference DL TDD configuration is TDD configuration 1 or TDD configuration 2.

In some embodiments (including but not limited to the above Examples 1 and 2), each ACK/NACK bit corresponds to a DL subframe mapping to a current UL physical uplink shared channel (PUSCH). If the receiver 510 does not receive PDCCH for DL scheduling in a DL subframe, the processor 540 may set ACK/NACK bit corresponding to the DL subframe to NACK.

Per the above described trigger mechanism, if the receiver 510 receives no DCI for DL scheduling in any DL subframe, the processor 540 controls the transmitter 520 not to report the ACK/NACK bits.

Also, in the embodiments as shown in FIG. 4, the processor 540 may separately encode ACK/NACK bits and map them to separate resource elements in UL transmission.

Figure 6:
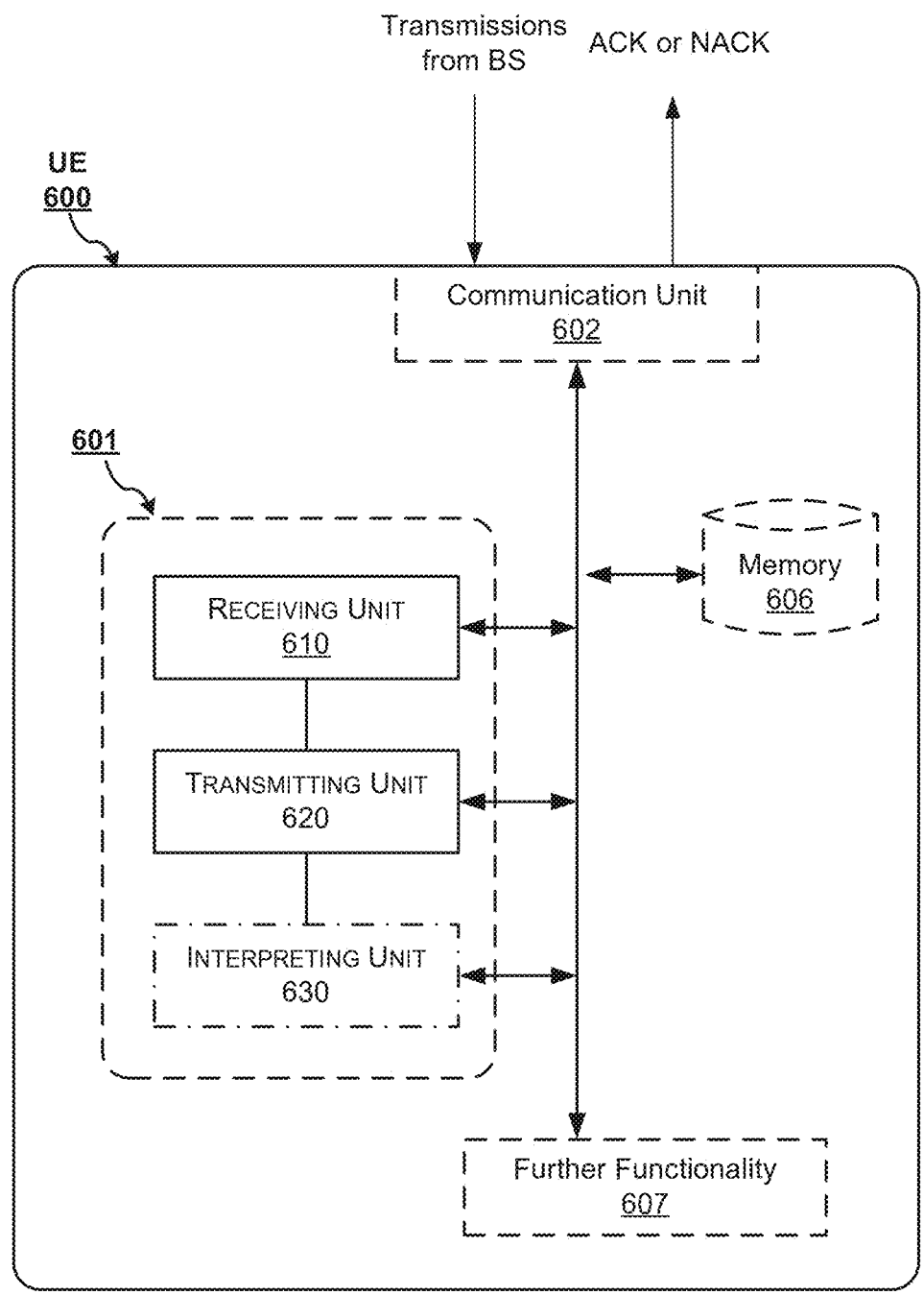
FIG. 6 is a schematic block diagram of UE according to some embodiments of the present disclosure.

FIG. 6 is a schematic block diagram of UE 600 according to some embodiments of the present disclosure.

The part of UE 600 which is most affected by the adaptation to the herein described method is illustrated as an arrangement 601, surrounded by a dashed line. The UE 600 could be configured to be operable, e.g. in an LTE and/or WCDMA system. The UE 600 and arrangement 601 are further configured to communicate with other entities via a communication unit 602 which may be regarded as part of the arrangement 601. The communication unit 602 comprises means for wireless communication such as one or more receivers, transmitters and/or transceivers. The arrangement 601 or UE 600 may further comprise other functional units 607, such as functional units providing regular UE functions, and may further comprise one or more storage units 606.

Figure 3:
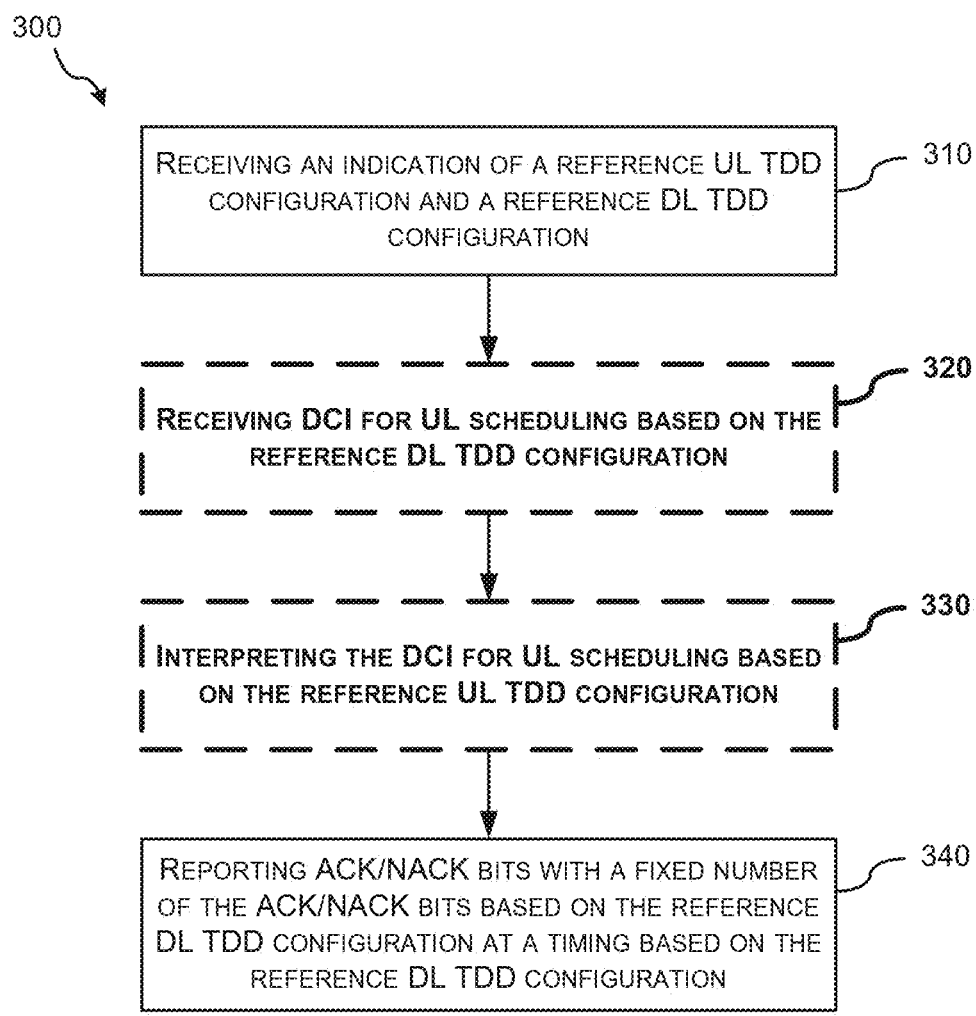
FIG. 3 is a flowchart showing the procedure of the method of the disclosure.

The arrangement 601 could be implemented, e.g., by one or more of: a processor or a micro processor and adequate software and memory for storing of the software, a Programmable Logic Device (PLD) or other electronic component(s) or processing circuitry configured to perform the actions described above, and illustrated, e.g., in FIG. 3.

The arrangement 601 of the UE 600 may be implemented and/or described as follows.

The arrangement 601 or UE 600 comprises a receiving unit 610 adapted or configured to receive an indication of a reference UL TDD configuration and a reference DL TDD configuration. The arrangement 601 or UE 600 further comprises a transmitting unit 620 adapted or configured to report ACK/NACK bits with a fixed number of the ACK/NACK bits based on the reference DL TDD configuration at a timing based on the reference DL TDD configuration. The receiving unit 610 can be further adapted or configured to receive DCI for UL scheduling based on the reference DL TDD configuration. The arrangement 601 or UE 600 may further comprise an interpreting unit 630 adapted or configured to interpret the received DCI for UL scheduling based on the reference UL TDD configuration. The receiving unit 610, the transmitting unit 620 and the interpreting unit 630 perform their respective operations, e.g., according to instructions stored in the one or more storage units 606.

As above, the fixed number of the ACK/NACK bits can be determined based on (e.g., fixed to) the maximum bit number available in the reference DL TDD configuration for one or more DL subframes allocated to the UE 600. As above, the reference UL TDD configuration can be TDD configuration 0, and the reference DL TDD configuration can be one of TDD configurations 1-6.

Similarly, UE 600 may be applied in the above Examples 1 or 2 in which the reference UL TDD configuration is TDD configuration 0, and the reference DL TDD configuration is TDD configuration 1 or TDD configuration 2.

In some embodiments (including but not limited to the above Examples 1 and 2), each ACK/NACK bit corresponds to a DL subframe mapping to a current UL physical uplink shared channel (PUSCH). If the receiving unit 610 does not receive PDCCH for DL scheduling in a DL subframe, the arrangement 601 may set ACK/NACK bit corresponding to the DL subframe to NACK.

Per the above described trigger mechanism, if the receiving unit 610 receives no DCI for DL scheduling in any DL subframe, the transmitting unit 620 will not to report the ACK/NACK bits.

Also, in the embodiments as shown in FIG. 4, the arrangement 601 may separately encode ACK/NACK bits and map them to separate resource elements in UL transmission.

Figure 7:
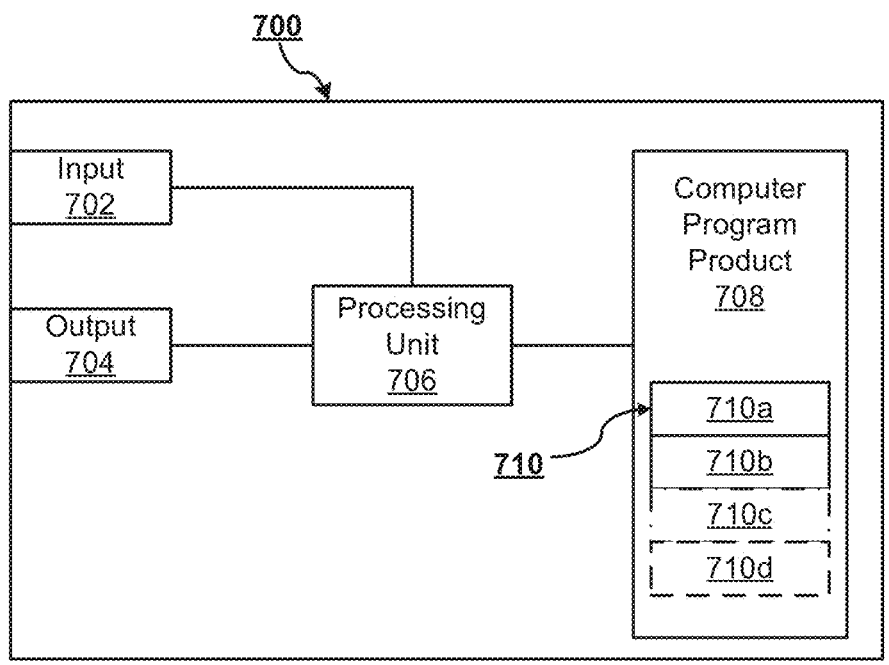
FIG. 7 is a schematic block diagram of arrangement according to some embodiments of the present disclosure.

FIG. 7 schematically shows an embodiment of an arrangement 700 which may be used in a UE 600. Comprised in the arrangement 700 are here a processing unit 606, e.g., with a Digital Signal Processor (DSP). The processing unit 606 may be a single unit or a plurality of units to perform different actions of procedures described herein. The arrangement 700 may also comprise an input unit 602 for receiving signals from other entities, and an output unit 604 for providing signal(s) to other entities. The input unit and the output unit may be arranged as an integrated entity or as illustrated in the example of FIG. 7.

Furthermore, the arrangement 700 comprises at least one computer program product 708 in the form of a non-volatile or volatile memory, e.g., an Electrically Erasable Programmable Read-Only Memory (EEPROM), a flash memory and a hard drive. The computer program product 708 comprises a computer program 710, which comprises code/computer readable instructions, which when executed by the processing unit 706 in the arrangement 700 causes the arrangement 700 and/or the UE in which it is comprised to perform the actions, e.g., of the procedure described earlier in conjunction with FIG. 3.

The computer program 710 may be configured as a computer program code structured in computer program modules 710a-710d. Hence, in an exemplifying embodiment, the code in the computer program 710 of the arrangement 700 comprises a receiving module 710a for receiving an indication of a reference UL TDD configuration and a reference DL TDD configuration. The computer program 710 further comprises a transmitting module 710b for reporting ACK/NACK bits with a fixed number of the ACK/NACK bits based on the reference DL TDD configuration at a timing based on the reference DL TDD configuration. The receiving module 710a can be also for receiving DCI for UL scheduling based on the reference DL TDD configuration. The computer program 710 may further comprise an interpreting module 710c for interpreting the received DCI for UL scheduling based on the reference UL TDD configuration. The computer program 710 may comprise further modules, illustrated as module 710d, e.g. for controlling and performing other related procedures associated with UE's operations.

The computer program modules could essentially perform the actions of the flow illustrated in FIG. 3, to emulate the arrangement 601 in the UE 600. In other words, when the different computer program modules are executed in the processing unit 706, they may correspond, e.g., to the units 610-630 of FIG. 6.

Although the code means in the embodiments disclosed above in conjunction with FIG. 7 are implemented as computer program modules which when executed in the processing unit causes the device to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the UE.

In an embodiment of the present disclosure, there is provided a wireless communication device (e.g., UE 600) for reporting ACK or NACK in dynamic TDD configurations, the wireless communication device (e.g., UE 600) comprising: means (e.g., receiving unit 610) for receiving an indication of a reference UL TDD configuration and a reference DL TDD configuration; and means (e.g., transmitting unit 620) for reporting ACK or NACK bits with a fixed number of the ACK or NACK bits based on the reference DL TDD configuration at a timing based on the reference DL TDD configuration.

The wireless communication device may further comprise: means (e.g., receiving unit 610) for receiving downlink control information (DCI) for UL scheduling based on the reference DL TDD configuration; and means (e.g., interpreting unit 630) for interpreting the DCI for UL scheduling based on the reference UL TDD configuration.

The fixed number of the ACK or NACK bits can be determined based on the maximum bit number available in the reference DL TDD configuration for one or more DL subframes allocated to the UE.

In an embodiment of the present disclosure, there is provided a terminal (e.g., arrangement 700) for reporting ACK or NACK in dynamic TDD configurations, the terminal (e.g., arrangement 700) comprising a processor (e.g., processing unit 706) and a memory (e.g., computer program product 708), said memory (e.g., computer program product 708) containing instructions executable by said processor (e.g., processing unit 706), whereby said terminal (e.g., arrangement 700) is operative to: receive an indication of a reference UL TDD configuration and a reference DL TDD configuration; and report ACK or NACK bits with a fixed number of the ACK or NACK bits based on the reference DL TDD configuration at a timing based on the reference DL TDD configuration.

Said memory (e.g., computer program product 708) may further contain instructions executable by said processor, whereby said terminal (e.g., arrangement 700) is operative to: receive DCI for UL scheduling based on the reference DL TDD configuration; and interpret the DCI for UL scheduling based on the reference UL TDD configuration.

The fixed number of the ACK or NACK bits may be determined based on the maximum bit number available in the reference DL TDD configuration for one or more DL subframes allocated to the UE.

In an embodiment of the present disclosure, there is provided a computer-readable storage medium (e.g., computer program product 708) storing instructions that when executed, cause one or more computing devices to perform the method according to the present disclosure.

Although the present technology has been described above with reference to specific embodiments, it is not intended to be limited to the specific form set forth herein. For example, the embodiments presented herein are not limited to the existing TDD configuration; rather they are equally applicable to new TDD configurations defined in future. The technology is limited only by the accompanying claims and other embodiments than the specific above are equally possible within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

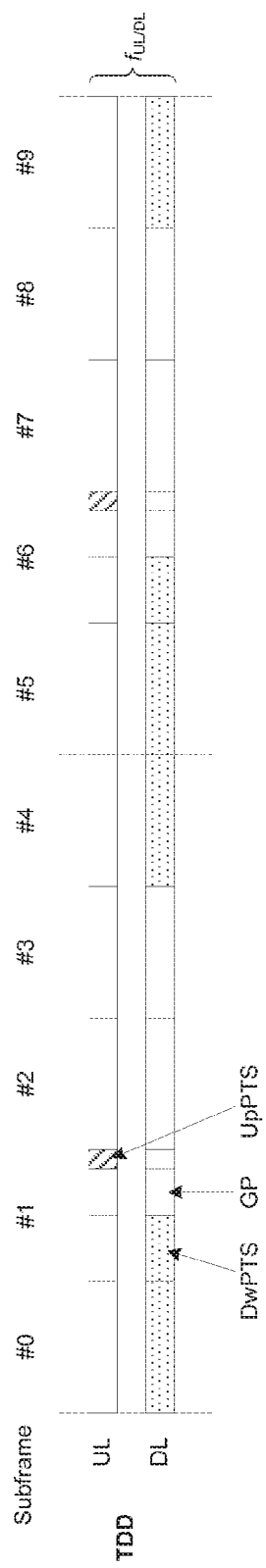

What is claimed is:

1. A method for use in a wireless communication device reporting acknowledgement (ACK) or non-acknowledgement (NACK) in dynamic time division duplex (TDD) configurations, the method comprising:
   receiving an indication of a reference uplink (UL) TDD configuration and a reference downlink (DL) TDD configuration where the reference UL TDD configuration is different than the reference DL TDD configuration and some subframes can be configured dynamically as either for UL or for DL; and
   reporting ACK or NACK bits with a fixed number of the ACK or NACK bits based on the reference DL TDD configuration at a timing based on the reference DL TDD configuration regardless of a number of DL transmissions received.

2. The method of claim 1, further comprising:
   receiving downlink control information (DCI) for UL scheduling based on the reference DL TDD configuration; and
   interpreting the DCI for UL scheduling based on the reference UL TDD configuration.

3. The method of claim 1, wherein the fixed number of the ACK or NACK bits is determined based on the maximum bit number available in the reference DL TDD configuration for one or more DL subframes allocated to the wireless communication device.

4. The method of claim 1, wherein the reference UL TDD configuration is TDD configuration 0, and the reference DL TDD configuration is one of TDD configurations 1-6.

5. The method of claim 4, wherein the reference DL TDD configuration is TDD configuration 1 or TDD configuration 2.

6. The method of claim 1, wherein each ACK or NACK bit corresponds to a DL subframe mapping to a current UL physical uplink shared channel (PUSCH).

7. The method of claim 1, wherein if physical downlink control channel (PDCCH) for DL scheduling is not detected in a DL subframe, an ACK or NACK bit corresponding to the DL subframe is set to NACK.

8. The method of claim 1, wherein if no DCI for DL scheduling is detected in any DL subframe, the ACK or NACK bits are not reported.

9. The method of claim 1, wherein the ACK or NACK bits are separately encoded and mapped to separate resource elements in UL transmission.

10. The method of claim 1, wherein the DCI for UL scheduling comprises DCI format 0.

11. A wireless communication device for reporting acknowledgement (ACK) or non-acknowledgement (NACK) in dynamic time division duplex (TDD) configurations, the wireless communication device comprising: a receiver, a transmitter, a memory and a processor,
   wherein
   the memory is configured to store TDD configurations;
   the processor is configured to control the receiver to receive an indication of a reference uplink (UL) TDD configuration and a reference downlink (DL) TDD configuration where the reference UL TDD configuration is different than the reference DL TDD configuration and some subframes can be configured dynamically as either for UL or for DL; and
   the processor is configured to control the transmitter to report ACK or NACK bits with a fixed number of the ACK or NACK bits based on the reference DL TDD configuration at a timing based on the reference DL TDD configuration regardless of a number of DL transmissions received.

12. The wireless communication device of claim 11, wherein
the processor is further configured to control the receiver to receive downlink control information (DCI) for UL scheduling based on the reference DL TDD configuration; and
the processor is further configured to interpret the DCI for UL scheduling based on the reference UL TDD configuration.

13. The wireless communication device of claim 11, wherein the fixed number of the ACK or NACK bits is determined based on the maximum bit number available in the reference DL TDD configuration for one or more DL subframes allocated to the wireless communication device.

14. The wireless communication device of claim 11, wherein the reference UL TDD configuration is TDD configuration 0, and the reference DL TDD configuration is one of TDD configurations 1-6.

15. The wireless communication device of claim 14, wherein the reference DL TDD configuration is TDD configuration 1 or TDD configuration 2.

16. The wireless communication device of claim 11, wherein each ACK or NACK bit corresponds to a DL subframe mapping to a current UL physical uplink shared channel (PUSCH).

17. The wireless communication device of claim 11, wherein if the receiver does not receive physical downlink control channel (PDCCH) for DL scheduling in a DL subframe, the processor sets an ACK or NACK bit corresponding to the DL subframe to NACK.

18. The wireless communication device of claim 11, wherein if the receiver receives no DCI for DL scheduling in any DL subframe, the processor controls the transmitter not to report the ACK or NACK bits.

19. The wireless communication device of claim 11, wherein the processor separately encodes ACK or NACK bits and maps the encoded ACK or NACK bits to separate resource elements in UL transmission.

20. The wireless communication device of claim 11, wherein the DCI for UL scheduling comprises DCI format 0.

* * * * *

UNITED STATES PATENT AND TRADEMARK OFFICE
CERTIFICATE OF CORRECTION

| | |
|---|---|
| PATENT NO. | : 9,826,544 B2 |
| APPLICATION NO. | : 14/761172 |
| DATED | : November 21, 2017 |
| INVENTOR(S) | : Guo et al. |

It is certified that error appears in the above-identified patent and that said Letters Patent is hereby corrected as shown below:

In the Drawings

Replace Figure 1, Sheet 1 of 7, with the attached Replacement Sheet.

In the Specification

In Column 2, Line 19, delete "(eNodeB's" and insert -- (eNodeBs --, therefor.

In Column 9, Line 61, delete "DC's" and insert -- DCIs --, therefor.

In Column 11, Line 63, delete "processing unit 606," and insert -- processing unit 706, --, therefor.

In Column 11, Lines 64-65, delete "processing unit 606" and insert -- processing unit 706 --, therefor.

In Column 11, Line 67, delete "input unit 602" and insert -- input unit 702 --, therefor.

In Column 12, Lines 1-2, delete "output unit 604" and insert -- output unit 704 --, therefor.

Signed and Sealed this
Seventeenth Day of July, 2018

Andrei Iancu
*Director of the United States Patent and Trademark Office*